US00RE49693E

(19) United States
(12) Reissued Patent
Kim et al.

(10) Patent Number: US RE49,693 E
(45) Date of Reissued Patent: Oct. 10, 2023

(54) PREAMBLE ALLOCATION METHOD AND RANDOM ACCESS METHOD IN MOBILE COMMUNICATION SYSTEM

(71) Applicant: Electronics and Telecommunications Research Institute, Daejeon (KR)

(72) Inventors: Jae-Heung Kim, Daejeon (KR); Kyoung-Seok Lee, Daejeon (KR); Jung-Im Kim, Daejeon (KR); Byung-Han Ryu, Daejeon (KR); Seung-Chan Bang, Daejeon (KR)

(73) Assignee: Electronics and Telecommunications Research Institute, Daejeon (KR)

(21) Appl. No.: 14/884,208

(22) Filed: Oct. 15, 2015

Related U.S. Patent Documents

Reissue of:
(64) Patent No.: 8,559,382
Issued: Oct. 15, 2013
Appl. No.: 12/528,810
PCT Filed: Mar. 14, 2008
PCT No.: PCT/KR2008/001469
§ 371 (c)(1),
(2) Date: Aug. 27, 2009
PCT Pub. No.: WO2008/111821
PCT Pub. Date: Sep. 18, 2008

(30) Foreign Application Priority Data

Mar. 15, 2007 (KR) ..... 10-2007-0025375

(51) Int. Cl.
*H04W 4/00* (2018.01)

(52) U.S. Cl.
CPC ..... *H04W 4/00* (2013.01)

(58) Field of Classification Search
CPC ..... H04W 74/0833
(Continued)

(56) References Cited

U.S. PATENT DOCUMENTS 6,574,212 B1 * 6/2003 Jurgensen et al. ..... 370/348
8,559,382 B2 10/2013 Kim et al.
(Continued)

FOREIGN PATENT DOCUMENTS

JP 2003-174673 6/2003
KR 102004004867 6/2004
(Continued)

OTHER PUBLICATIONS

3GPP TS 25.331—V4.17.0 (2005).
(Continued)

*Primary Examiner* — Eron J Sorrell
(74) *Attorney, Agent, or Firm* — INSIGHT LAW GROUP, PLLC; Seung Lee

(57) ABSTRACT

[The present invention relates to a] *A* preamble allocation method [and a random access method] in a mobile communication system[. In the present invention,] *includes allocating* one among preamble resources [is allocated] to *a* specific mobile [stations] *station* in advance, before random access. The mobile [stations request] *station requests* random access by transmitting a preamble based on the pre-allocated preamble resource to a base station. [It is therefore possible to prevent] *A* collision caused by [the fact that other mobile stations transmit the same preamble] *the same preamble transmission by another mobile station may be prevented.*

15 Claims, 8 Drawing Sheets

(58) Field of Classification Search
USPC ..... 370/329
See application file for complete search history.

(56) References Cited

U.S. PATENT DOCUMENTS

2003/0095528 A1* 5/2003 Halton ..... H04W 74/0875 370/342
2005/0243940 A1 11/2005 Huh et al.
2006/0018289 A1* 1/2006 Schulist ..... H04W 52/50 370/335
2006/0126570 A1* 6/2006 Kim et al. ..... 370/335
2007/0047493 A1* 3/2007 Park et al. ..... H04W 36/0055 370/331
2007/0140178 A1* 6/2007 Jung et al. ..... H04W 72/1294 370/335
2007/0206531 A1* 9/2007 Pajukoski et al. ..... 370/329
2007/0217534 A1* 9/2007 Lee ..... H04L 27/2656 375/260
2007/0291708 A1* 12/2007 Rao ..... 370/338
2008/0025254 A1* 1/2008 Love ..... H04W 52/367 370/329
2008/0056193 A1* 3/2008 Bourlas ..... H04W 74/0875 370/331
2008/0080423 A1* 4/2008 Kolding ..... H04W 72/1263 370/329
2008/0273610 A1* 11/2008 Malladi ..... H04L 1/0029 375/260
2009/0219906 A1* 9/2009 Motegi ..... H04W 72/042 370/342
2010/0260140 A1* 10/2010 Zhu ..... H04W 36/0005 370/331

FOREIGN PATENT DOCUMENTS

KR 1020040048675 6/2004
KR 1020070017610 2/2007
WO 08/111821 A1 9/2008

OTHER PUBLICATIONS

3GPP TSG RAN WG2 #57bis, "Non-Contention based RA preamble," (2007).
International Search Report for Application No. PCT/KR2008/001469, dated Jun. 24, 2008.

* cited by examiner

PREAMBLE ALLOCATION METHOD AND RANDOM ACCESS METHOD IN MOBILE COMMUNICATION SYSTEM

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

RELATED APPLICATIONS

This application *is a reissue application of U.S. Pat. No. 8,559,382 issued on Oct. 15, 2013, which is issued from U.S. patent application Ser. No. 12/528,810, filed on Aug. 27, 2009, which* is a 35 U.S.C. §371 national stage filing of PCT Application No. PCT/KR2008/001469 filed on Mar. 14, 2008, which claims priority to, and the benefit of, Korean Patent Application No. 10-2007-0025375 filed on Mar. 15, 2007. The contents of the aforementioned applications are [hereby] incorporated *herein* by reference.

TECHNICAL FIELD

The present invention relates to a resource allocation method in a mobile communication system. More particularly, the present invention relates to a method for allocating a preamble resource and a method for performing random access using the preamble resource.

BACKGROUND ART

A base station and a mobile station perform a random access procedure to set up an initial call in a circuit-based mobile communication system including WCDMA (wideband code division multiple access).

The random access procedure starts when a mobile station that attempts to access a base station transmits a signal sequence having a specific pattern. The base station manages the signal sequence information having a specific pattern (hereinafter called a "preamble") based on contention so that any mobile station can use it. Preambles are designed to be detected easily without pre-information. For this purpose, indexes may be used to identify preamble patterns. Information on these preambles is pre-fixed by a system and then used, or is obtained from system information broadcasted from a base station.

In order to perform the random access procedure, the mobile station selects a preamble pattern (or an index) from among information on preambles, generates a preamble based on the selected preamble pattern, and transmits the same to the base station based on contention. The preamble is transmitted during an access slot interval having a predetermined length, and the mobile station transmits the selected preamble pattern during an initial interval of the access slot interval.

The base station transmits response information using a pattern or an index of a corresponding preamble to the mobile station when the preamble is detected within a specific interval, and then a call set-up procedure is initiated. The random access procedure is performed by a mobile station that is in a state (e.g., idle state) of having no connection with the base station.

The random access procedure is performed as described above in a packet switch-based mobile communication system.

However, in the packet switch-based mobile communication system, even if a mobile station is in an active state in which packet service is provided between the mobile station and the base station, a radio resource for packet information communication is not dedicatedly allocated to the mobile station while the packet service is provided. That is, logical channels continue to exist so as to transmit packet data, while physical channels, that is, radio resources, are shared by a plurality of mobile stations that are located within service coverage of the base station.

Accordingly, the mobile station should perform the random access procedure to obtain the uplink radio resource when uplink synchronization is not maintained even though the mobile station is in an RRC (radio resource control)-connected state with the base station.

However, the random access procedure is contention-based, and thereby collision occurs. As a result, it causes delay in performing the random access procedure. Further, it causes delay in allocating radio resources.

DISCLOSURE

Technical Problem

The present invention has been made in an effort to provide a method for efficiently allocating preamble resources in order to reduce the possibility of delay or collision in a random access procedure.

The present invention has been made in another effort to provide a method for performing a random access procedure based on the preamble resources that are managed by the preamble resource allocation method.

Technical Solution

According to a first aspect of the present invention, a method for allocating a preamble includes dividing preamble resources into a contention-based group and a reserved allocation group, and allocating a preamble resource of the reserved allocation group to a mobile station.

According to a second aspect of the present invention, a method for allocating preamble includes allocating one of preamble resources for constituting a preamble to a mobile station, and dividing preamble radio resources for preamble transmission into a contention-based region and a reserved allocation region in which the mobile station receiving the allocation of the preamble resource transmits a preamble.

In the preamble allocation method, when the preamble includes a first part for representing a random property and a second part for representing additional information, the step of dividing may include dividing the preamble resources into a contention-based region, a reserved allocation region, and an additional information region.

In this case, in the mobile communication system, a preamble resource of the additional information group is allocated to a mobile station that satisfies one of predetermined conditions for preamble allocation, and a preamble resource of the reserved allocation group is allocated to a mobile station that satisfies the remaining predetermined conditions.

According to a third aspect of the present invention, a method for a mobile station to perform random access in a mobile communication system includes receiving a preamble resource of a plurality of preamble resources from a base station, generating a preamble based on the preamble resource, requesting random access by transmitting the preamble to the base station, and receiving a response to the random access request and acquiring synchronization with the base station according to the response.

In the random access method, preamble resources are divided into a contention-based group and a reserved allocation group, and the step of receiving the preamble resource may include receiving a preamble resource of the reserved allocation group from the base station. Preamble radio resources for preamble transmission are divided into a contention-based region and a reserved allocation region, wherein the step of requesting random access transmits the preamble to the base station through the reserved allocation region.

According to a fourth aspect of the present invention, a method for a mobile station to perform random access in a handover process in a mobile communication system includes receiving a message provided from a target base station in response to a handover request from a source base station, the message including a preamble resource that is selected by the target base station from a plurality of preamble resources, generating a preamble based on the preamble resource, requesting random access by transmitting the preamble to the target base station, and receiving a response to the random access request and acquiring synchronization with the target base station according to the response.

Advantageous Effects

It is possible to prevent collision caused by contention from a random access procedure and to reduce time delay in the procedure since a preamble resource for random access is allocated to a mobile station in advance, and the mobile station uses the allocated preamble resource in performing random access in mobile communication.

MODE FOR INVENTION

Figure 1:
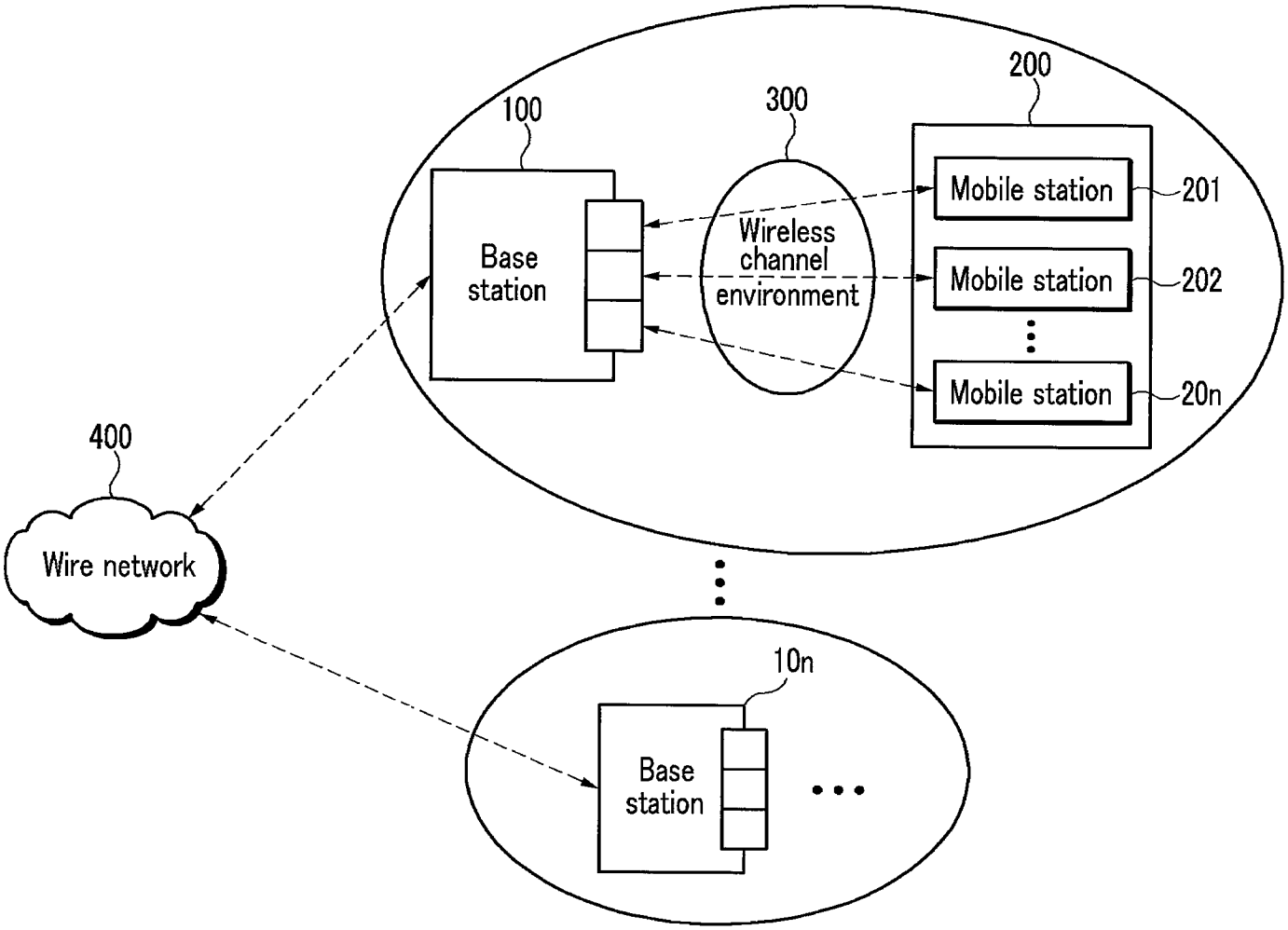
FIG. 1 shows a configuration diagram of a mobile communication system according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification. Throughout the specification, unless explicitly described to the contrary, the word "comprise" and variations such as "comprises" or "comprising" will be understood to imply the inclusion of stated elements but not the exclusion of any other elements.

In this specification, a mobile station (MS) may refer to a terminal, a mobile terminal (MT), a subscriber station (SS), a portable subscriber station (PSS), user equipment (UE), or an access terminal (AT). The mobile terminal may include all or part of the functions of the mobile station, the subscriber station, the portable subscriber station, and the user equipment. In this specification, a base station (BS) may refer to an access point (AP), a radio access station (RAS), a node B, a base transceiver station (BTS), or an MMR (mobile multihop relay)-BS. The base station may include all or part of the functions of the access point, the radio access station, the node B, the base transceiver station, and the MMR-BS.

Now, an exemplary embodiment of the present invention will be described in detail with reference to the accompanying drawings.

FIG. 1 is a configuration diagram of a mobile communication system according to an exemplary embodiment of the present invention.

As shown in FIG. 1, in the mobile communication system according to the exemplary embodiment of the present invention, a base station 100 communicates with a plurality of mobile stations (201, 202, . . . 20n, where n is a positive integer) through a radio channel environment 300. For the better comprehension and ease of description, a mobile station will be assigned the representative number 200.

The base station 100 communicates with the mobile station 200 and performs radio resource allocation for an up-link channel of the mobile station 200 on the basis of information from the mobile station 200.

The communication system including the OFDMA (orthogonal frequency division multiplexing access) system according to the exemplary embodiment of the present invention uses radio resources of a two-dimensional structure with frequency and time. The radio resources include radio resource blocks that are divided into a TTI (transmission time interval), that is, a transmission interval, and a sub-carrier group. Radio frames that constitute radio resources include TTI (or a slot) with a specific size (e.g., 0.5 msec). For example, a wireless frame of 10 msec includes 20 slots. The radio resource is divided into downlink radio resources and uplink radio resources, and the uplink radio resources include radio resources for preamble transmission of mobile stations. For better comprehension and ease of description, the radio resource for the preamble transmission will be referred to as "preamble radio resource".

The preamble radio resource may be situated in a fixed slot (e.g., a first slot or a last slot) of an uplink wireless frame, and a preamble may be transmitted by random access burst units through the preamble radio resource.

Preambles may be generated by various methods. It is possible to constitute a preamble set having a specific pattern, for example to generate a maximum of 64 preambles with different patterns. Each pattern is identified with an index, and the index is referred to as a "preamble index".

The preamble index may be represented with 6 bits. A mobile station randomly selects one from among 64 preamble indexes that are each represented with 6 bits when performing random access, generates a preamble based on the selected preamble index, and transmits the same. In the exemplary embodiment of the present invention, the preamble resources include all of things that constitute a preamble, such as a preamble pattern and a preamble index.

In the mobile communication system having these features, a mobile station maintains uplink physical layer synchronization with a base station so as to transmit information. That is, the base station controls timing of uplink signals transmitted by the mobile station so that the signals are received within a CP (cyclic prefix) interval that is determined in advance. For this purpose, the mobile station performs random access, thereby setting synchronization with the base station and requesting radio resources.

The mobile station performs random access to access the base station when uplink physical layer synchronization with the base station is not set or the mobile station is in an idle state. In addition, the mobile station performs random access to request a radio resource in an active state (or a connected state) when the mobile station communicates with a base station or in a state when uplink physical layer synchronization with the base station is maintained.

In the exemplary embodiment of the present invention, one among preamble resources is allocated to a mobile station before random access, which starts in variable states, so that contention between mobile stations is prevented and time for processing the random access procedure is reduced. As a result, the mobile station transmits a preamble on the basis of the pre-allocated preamble resource and requests random access. Particularly, in the exemplary embodiment of the present invention, a mobile station that satisfies conditions receives a preamble resource, that is, a preamble index, in advance. The conditions include the following.

1) A condition that a mobile station has not exchanged packet information with a base station for more than a predetermined time or a mobile station does not maintain uplink synchronization because of various reasons in the following conditions.

1-1) In the condition that a mobile station receives information being transmitted from a base station and notifying of downlink service restart, and performs random access to achieve uplink physical layer synchronization.

1-2) In the condition that a base station allocates a radio resource to a mobile station for status reporting or measurement reporting and then the mobile station performs random access to achieve uplink physical layer synchronization.

2) In the condition that a mobile station performs random access to start packet transmission to a target base station in a handover process.

In the exemplary embodiment of the present invention, a preamble index is allocated to a mobile station that satisfies the above conditions (these are referred to as "predetermined conditions" for better comprehension and ease of description) in advance. The predetermined conditions according to the exemplary embodiment of the present invention are not restricted to the above conditions.

Figure 2:
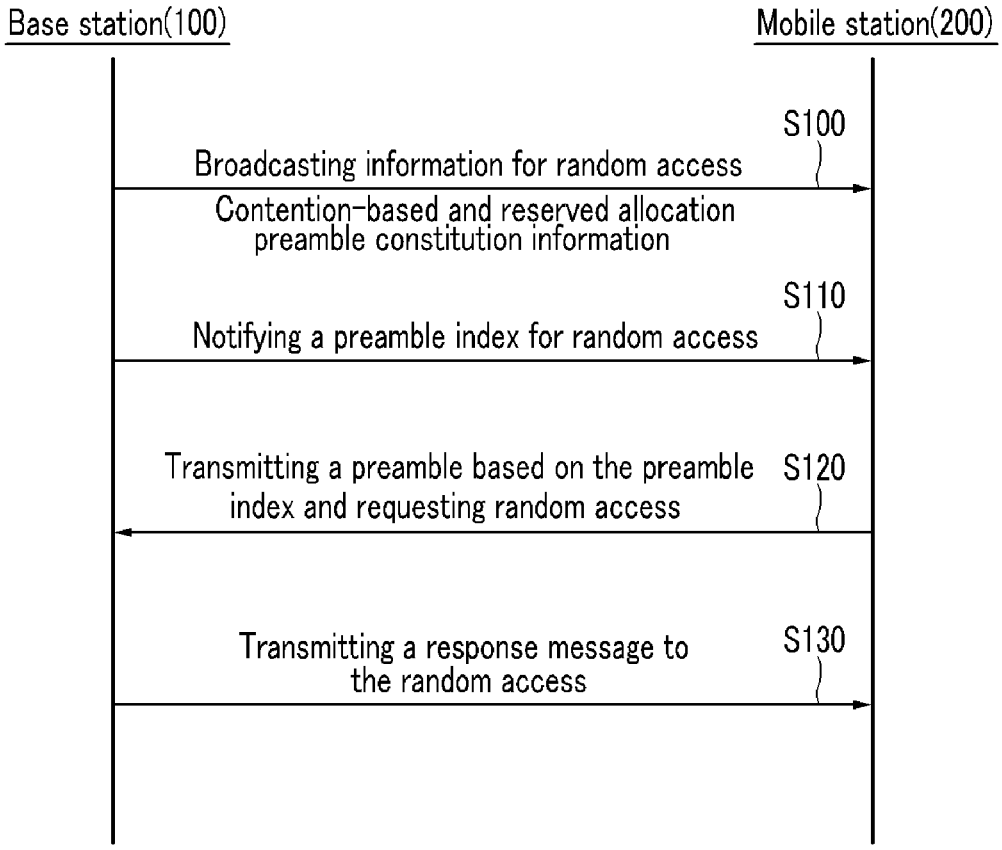
FIG. 2 shows a brief flowchart of a random access method according to the exemplary embodiment of the present invention.

FIG. 2 shows a flowchart of a random access method according to an exemplary embodiment of the present invention.

The random access method according to the present invention is generally described below. As shown in FIG. 2, a base station 100 broadcasts information on preambles to mobile stations that are positioned in a service area (S100).

When a mobile station 200 satisfies the predetermined conditions, the base station 100 selects one from among preamble indexes and provides the same to the mobile station 200 (S110). The mobile station 200 requests random access based on the selected preamble index, and thereby prevents contention between mobile stations (S120). The random access method will be described in detail below.

However, mobile stations that are not provided with a preamble index in advance randomly select one from among preamble indexes and perform contention-based random access.

The preamble allocation method and the random access method on the basis of the preamble allocation method according to exemplary embodiments of the present invention based on the above features of the present invention will be described in detail below.

First, the preamble allocation method and the random access method on the basis of the preamble allocation method according to a first exemplary embodiment of the present invention will be described.

Figure 3:
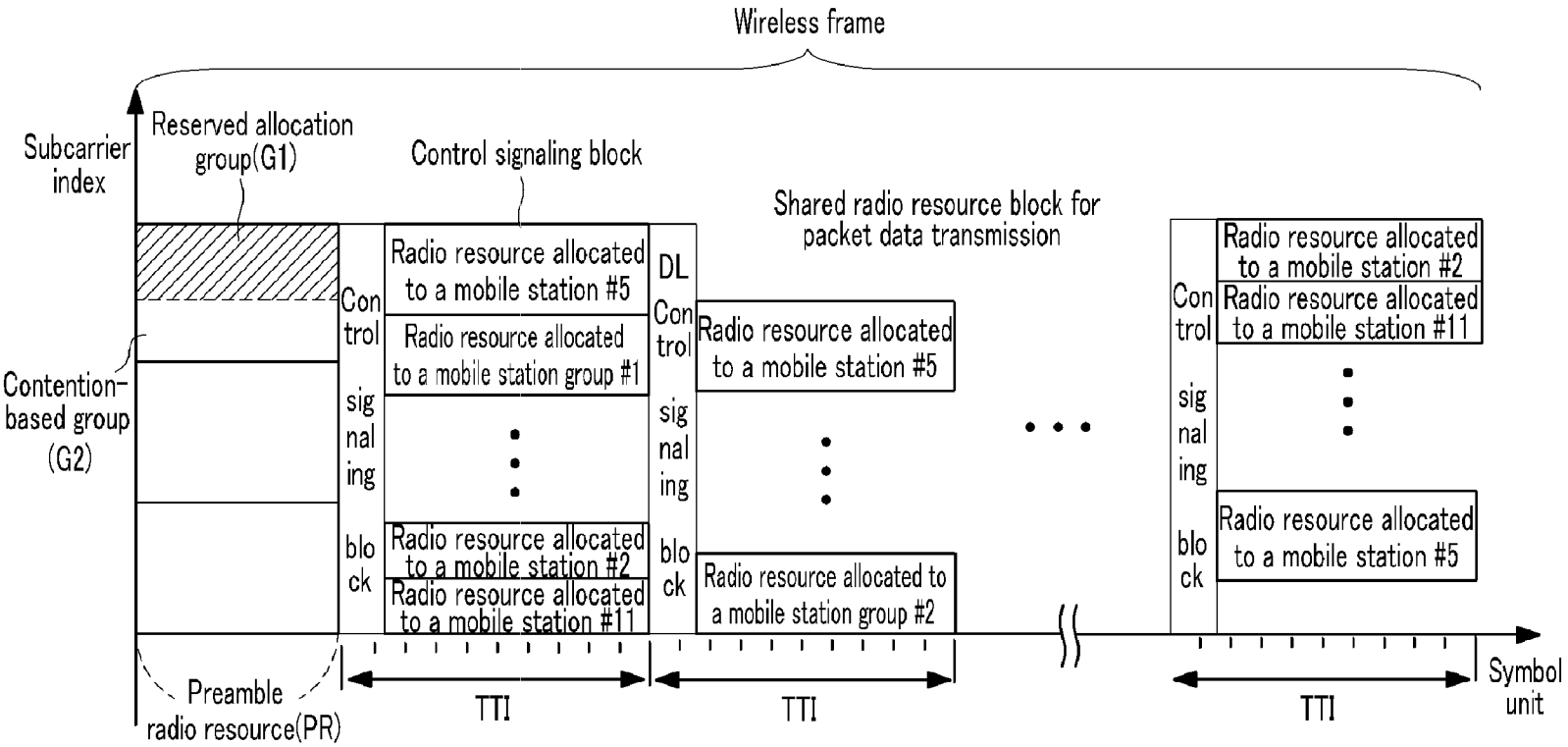
FIG. 3 shows a preamble allocation method according to a first exemplary embodiment of the present invention.

FIG. 3 shows the preamble allocation method according to the first exemplary embodiment of the present invention.

In the first exemplary embodiment of the present invention, some of the entire preamble indexes that can be generated from preamble resources for preamble transmission for random access of uplink are used for reserved-based random access, and the remaining are used for contention-based random access.

As shown in FIG. 3, radio resource blocks, which are made with subcarrier indexes and correspond to the TTI transmission interval which is a symbol index, are allocated as preamble radio resources. Some of the entire preamble indexes that are constructible from the preamble resources are classified to a reserved allocation group G1, and the remaining are classified to a contention-based group G2.

Radio resource allocation information on preamble radio resources includes radio resource block position information and radio resource allocation interval information. The radio resource block position information is to address radio resources identified with a frequency axis and a time axis, and includes subcarrier indexes and symbol indexes.

The radio resource allocation interval information represents in which interval an allocated radio resource is valid. The radio resource allocation information on an allocated preamble radio resource may be predetermined and is then applied in the entire system as the same. Also, the radio resource allocation information may be included in system information and then broadcasted through a broadcasting channel by a base station. Furthermore, the radio resource allocation information may be transmitted using a radio resource that is allocated for downlink scheduling information transmission.

The random access according to the first exemplary embodiment of the present invention will be described based on preambles that are managed by the preamble allocation method.

A random access method according to a first example of the first exemplary embodiment of the present invention will be described.

Figure 4:
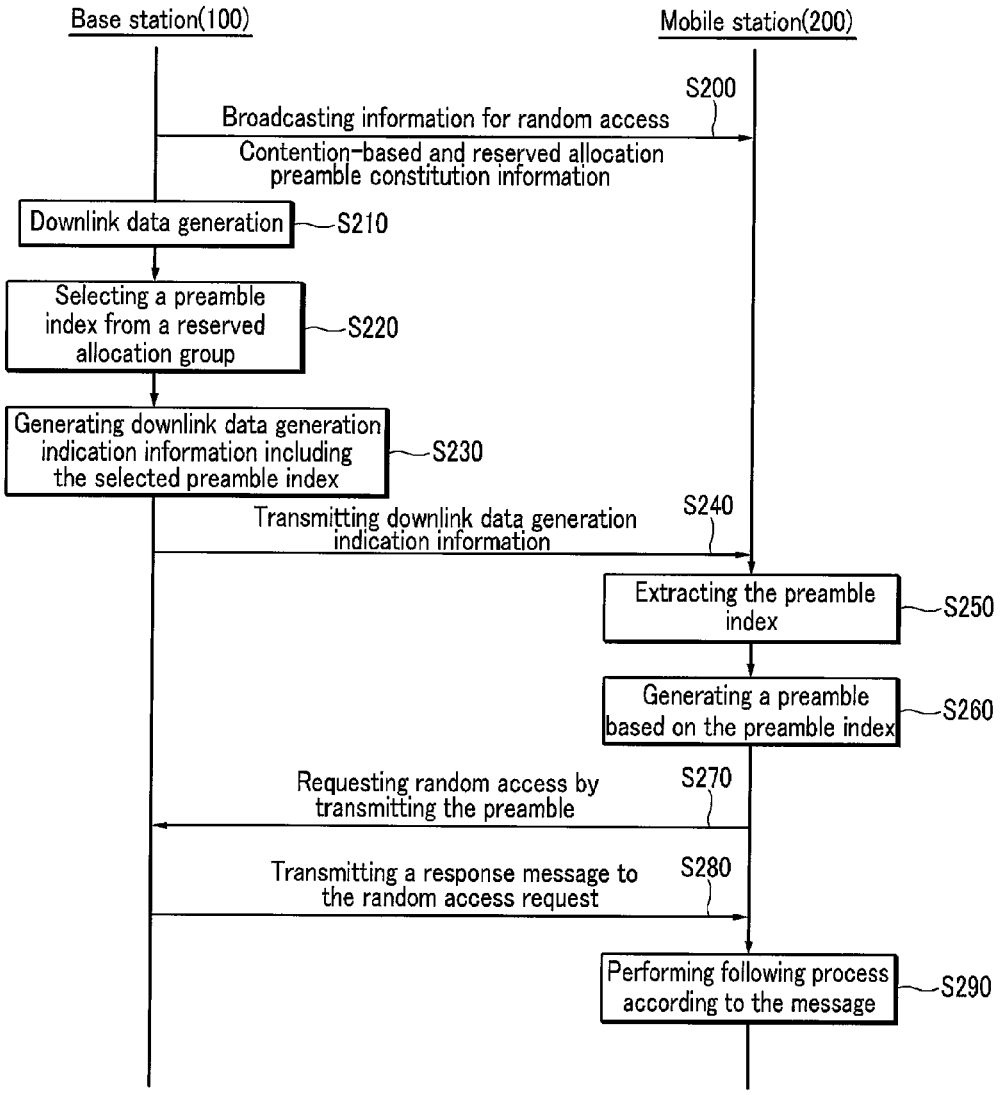
FIG. 4 shows a flowchart of a random access method according to a first example of the first exemplary embodiment of the present invention.

FIG. 4 shows a flowchart of the random access method according to the first example of the first exemplary embodiment of the present invention.

The random access method according to the first example of the first exemplary embodiment of the present invention is performed when packet information has not been transmitted/received for more than a predetermined time in an active state in which a mobile station communicates with a base station, or when downlink data to be transmitted to a mobile station that does not maintain uplink synchronization with a base station for some reason is generated.

As shown in FIG. 4, a base station 100 generates downlink data and indication information to a corresponding mobile station when downlink data to be provided to a mobile station 200 that is in the above states is generated (S200-S230).

Particularly, the base station 100 selects one from among the preamble indexes of the reserved allocation group G1, includes it in the downlink data generating indication information, and transmits the same through a downlink radio resource (S240).

The mobile station 200 receives the downlink data generating indication information, extracts the preamble index therefrom, and generates a preamble based on the preamble index (S250-S260). The mobile station 200 requests random access by transmitting the generated preamble to the base station 100 (S270). The mobile station 100 transmits the preamble on the basis of the preamble index that is allocated by the base station in advance, as described above. As a result, collisions because other mobile stations use the same preamble are prevented, and so a delay is prevented.

In the above preamble transmission step, the mobile station 200 transmits the generated preamble through a preamble radio resource (PR) (referring to FIG. 2). The mobile station may obtain resource allocation information on the preamble radio resource from system information broadcasted through a broadcasting channel. Also, the resource allocation information may be included in the generated downlink data indication information from the base station.

When receiving the preamble, the base station 100 generates a response message to the random access request according to whether or not the preamble index included in the preamble is equal to the preamble index that is allocated to the mobile station in the steps of S220-S230, and transmits the response message to the mobile station 200 (S280). The response message includes a positive response (ACK) or a negative response (NACK), representing whether or not the base station receives the preamble from the mobile station that requests random access. Further, downlink data allocation information on radio resources in which downlink data will be transmitted, a scheduling indicator, and so on may be included in the response message.

Therefore, the mobile station 200 retransmits the preamble when NACK is included in the response message, whereas the mobile station 200 receives downlink data to be transmitted through a radio resource corresponding to the downlink radio resource allocation information later when ACK is included in the response message S290.

The random access according to a second example of the first exemplary embodiment of the present invention will now be described.

Figure 5:
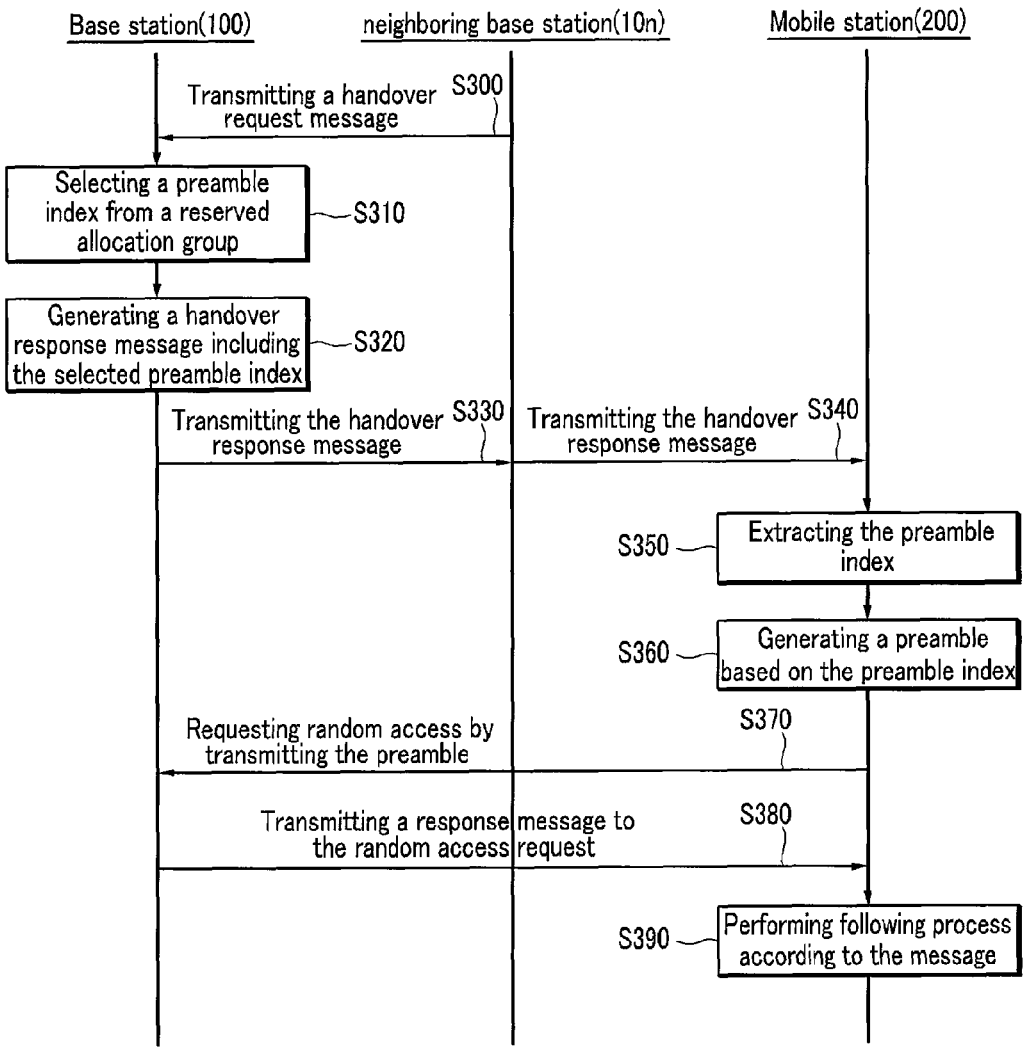
FIG. 5 shows a flowchart of a random access method according to a second example of the first exemplary embodiment of the present invention.

FIG. 5 shows a flowchart of the random access method according to the second example of the first exemplary embodiment of the present invention.

The random access method according to the second example of the first exemplary embodiment of the present invention is performed when a mobile station wants to perform a handover.

As shown in FIG. 5, a base station 100 performs a general process for a handover when receiving a handover request message for a mobile station from a neighboring base station 10n, and then selects one from among the preamble indexes of the reserved allocation group G1 (S310). The base station 100 includes the selected preamble index in a response message to the handover request, and transmits the same to the neighboring base station 10n (S320-S330).

The mobile station 200 extracts a preamble index that is allocated by the base station 100, that is, a target base station, from the response message sent by the neighboring base station 10n, that is, a source base station (S340-S350).

When the handover is completed, the mobile station 200 transmits a preamble that is generated based on the extracted preamble index to the target base station 100, requests random access (S360), and performs data transmitting/receiving with the target base station 100 through a radio resource that is allocated by the target base station 100 according to a random access response message (S370-S390).

In this case, the base station 100 may transmit resource allocation information on a preamble radio resource by including it in the response message to the random access request, and the mobile station 200 may transmit the preamble through the preamble radio resource (PR).

Accordingly, the mobile station to perform the handover transmits the preamble based on the preamble index that is allocated in advance, thereby preventing a collision from occurring when other mobile stations use the same preamble and processing delay.

The random access method according to the second example of the first exemplary embodiment of the present invention is performed in a backward handover in which a mobile station requests a target base station to perform a handover via a source base station. In addition, random access using the preamble indexes of the contention-based group in a forward handover in which a mobile station directly requests a target base station to perform a handover may also occur. However, the present invention is not restricted to the above-described situations.

A base station may allocate preamble indexes of the reserved allocation group to a mobile station as above-described when requesting a mobile station that does not maintain uplink synchronization in an active status to perform status reporting or measurement reporting so that the mobile station performs random access on the basis of the allocated preamble index. In addition, the base station may transmit the preamble index by including it in information on uplink radio resources for status reporting or measurement reporting. Since a person of ordinary skill in the art can realize the random access method of the mobile station based on the examples according to the exemplary embodiment of the present invention, a detailed description of the method is omitted.

Meanwhile, contrary to the first exemplary embodiment, when a mobile station does not receive a preamble index in advance, the mobile station randomly selects one from among contention-based preamble indexes and performs contention-based random access by transmitting a preamble based on the selected preamble index through the preamble radio resource. Sine this random access method is disclosed in the art, a detailed description of the method is omitted.

Next, a preamble allocation method and a random access method based on the preamble allocation method according to a second exemplary embodiment of the present invention will be described.

In the second exemplary embodiment of the present invention, preamble radio resources are divided into a contention-based region PR1 and a reserved allocation region PR2 so that a mobile station that receives a preamble index in advance transmits a preamble through the reserved allocation region PR2 and a mobile station that does not receive a preamble index in advance transmits a preamble through the contention-based region PR1. In this case, a specific preamble index is allocated to a mobile station that satisfies the predetermined condition in advance.

Figure 6:
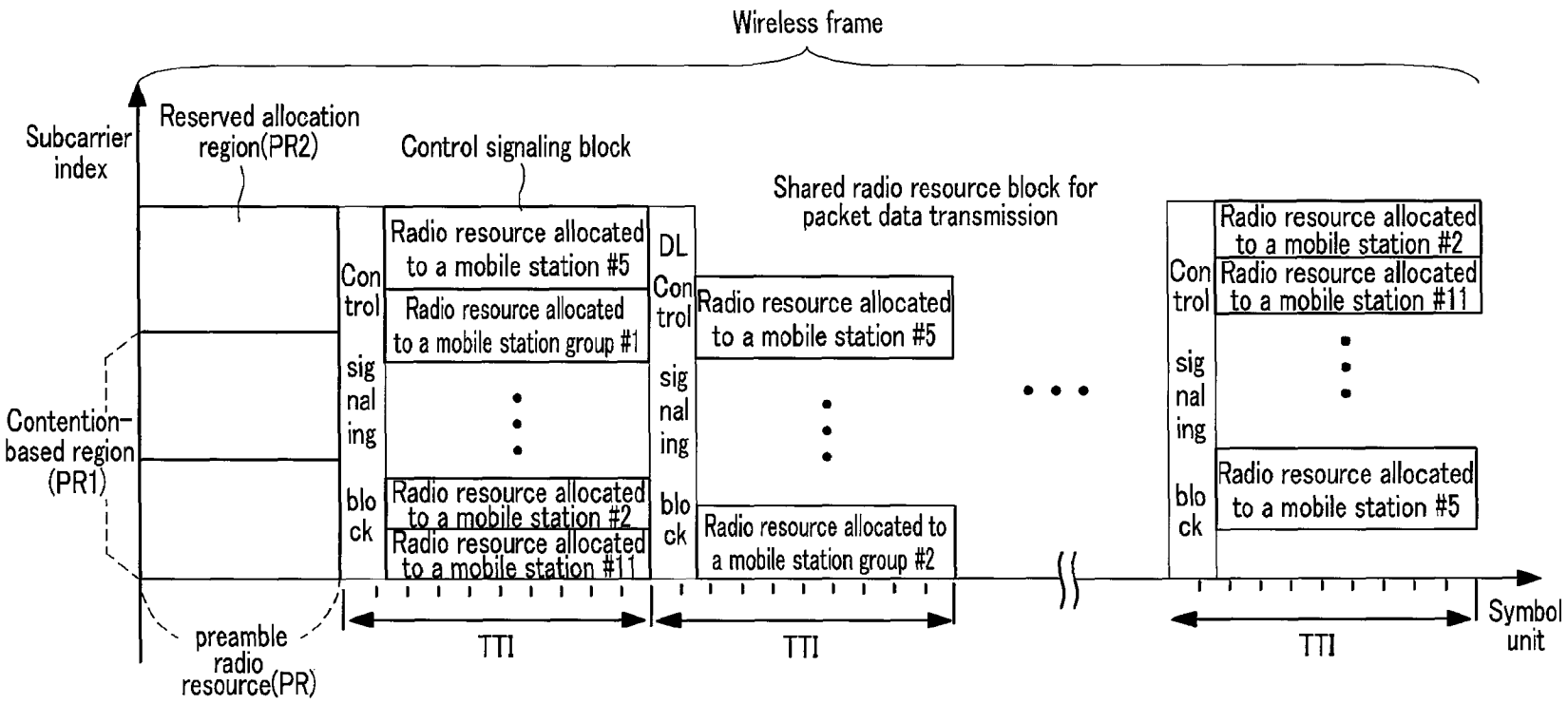
FIG. 6 shows a preamble allocation method according to a second exemplary embodiment of the present invention.

FIG. 6 shows a flowchart of the preamble allocation method according to the second exemplary embodiment of the present invention.

As shown in FIG. 6, the preamble radio resources PR in radio resources that are identified with a frequency axis and a time axis are divided into the contention-based region PR1 and the reserved allocation region PR2. The contention-based region PR1 includes preamble radio resources corresponding to contention-based preamble indexes, and the reserved allocation region PR2 includes preamble radio resources corresponding to reserved allocation preamble indexes, that is, preamble indexes that are allocated by a base station in advance.

In the second exemplary embodiment of the present invention in which the preamble radio resource allocation is performed, mobile stations request random access by transmitting a preamble based on a preamble index to the base station through the reserved allocation region PR2 of the preamble radio resources when the mobile station receives the preamble index in advance from the base station through the downlink data generating indication information or the handover response message as described in the first exemplary embodiment.

Therefore, the base station 100 can determine which mobile station transmits the preamble when receiving the preamble through the reserved allocation region PR2. In this case, it is unnecessary to perform a contention resolution procedure since there is no contention between mobile stations. As a result, it is possible to prevent a delay caused by contention from processing random access.

In the second exemplary embodiment, the base station may select one from among the entire preamble indexes and allocate it to a mobile station that satisfies the predetermined condition in advance. Also, the entire preamble indexes may be divided into a reserved allocation group G1 and a contention-based group G2 as described in the first exemplary embodiment. In this case, one among the preamble indexes of the reserved allocation group G1 is selected and allocated to a mobile station that satisfies the predetermined condition. The mobile station may transmit a preamble generated on the basis of the allocated preamble of the reserved allocation group G1 through the reserved allocation region PR2 of the preamble radio resources (PR).

Since a person of ordinary skill in the art can realize the random access method according to the second exemplary embodiment of the present invention based on the first exemplary embodiment, a detailed description of the random access method is omitted.

Meanwhile, a mobile station randomly selects one from among preamble indexes and performs random access by transmitting a preamble generated on the basis of the selected preamble index through the contention-based region PR1 of the preamble radio resources when not receiving a preamble index in advance from a base station. In addition, when the preamble indexes are divided as in the first exemplary embodiment, the mobile station randomly selects one from among the preamble index of the contention-based group G2 and transmits a corresponding preamble through the contention-based region PR1.

Next, a preamble allocation method and a random access method based on the preamble allocation method according to a third exemplary embodiment of the present invention will be described.

The third exemplary embodiment of the present invention relates to a method of managing preambles that include additional information, and a method for a mobile station to perform random access according to the preambles.

Additional information may be included in a preamble and transmitted in a random access procedure for efficiency of resource allocation. That is, a preamble that includes a first part representing a random property and a second part representing additional information may be transmitted. For example, when the preamble is represented with 6 bits, the random property is 5 bits and the additional information is 1 bit.

The following may be considered as additional information that may be included in the preamble.

1) CQI (channel quality indicator) information that may represent path loss of a mobile station.

2) Information representing a reason for a mobile station to attempt to perform random access, which may include the following.

Information representing that a mobile station is performing a handover.

Information representing that the present access attempt is not an initial access to a base station.

Information representing that uplink synchronization acquisition or resource allocation is requested.

When the additional information is 1 bit, it may be difficult to represent the above information with 1 bit. In this case, the following may be included as additional information.

1) CQI information: represents that a corresponding channel has quality of more than a predetermined value in a service area of a base station.

2) Information representing that a mobile station accesses via a neighboring base station in a handover process, which will be referred to as "handover indication information".

3) Information representing that a mobile station does not perform initial access and maintains a connection with a base station, which will be referred to as "active state indication information".

A base station may perform various functions based on the additional information that is transmitted and included in a preamble. For example, the base station can adaptively allocate a radio resource based on CQI information that is included in a preamble transmitted from a mobile station when transmitting a response message according to random access.

Considering the case in which a preamble including additional information is transmitted as described above, preamble indexes can be divided into a contention-based group, a reserved allocation group, and an additional information group. Preamble indexes of the additional information group are allocated to a mobile station corresponding to additional information to be included in a preamble. Preamble indexes of the reserved allocation group are allocated to a mobile station that does not correspond to the additional information but satisfies the predetermined conditions as in the first exemplary embodiment. Preamble indexes of the contention-based group are allocated to other mobile stations.

When a preamble index for random access includes a random property of a first bit (e.g., 5 bit) and additional information of a second bit (e.g., 1 bit) for an upper layer (the upper layer of a physical layer), two cases are considered as follows.

A first case in which additional information represents a mobile station performing a handover process via a neighboring base station will be firstly described.

Figure 7:
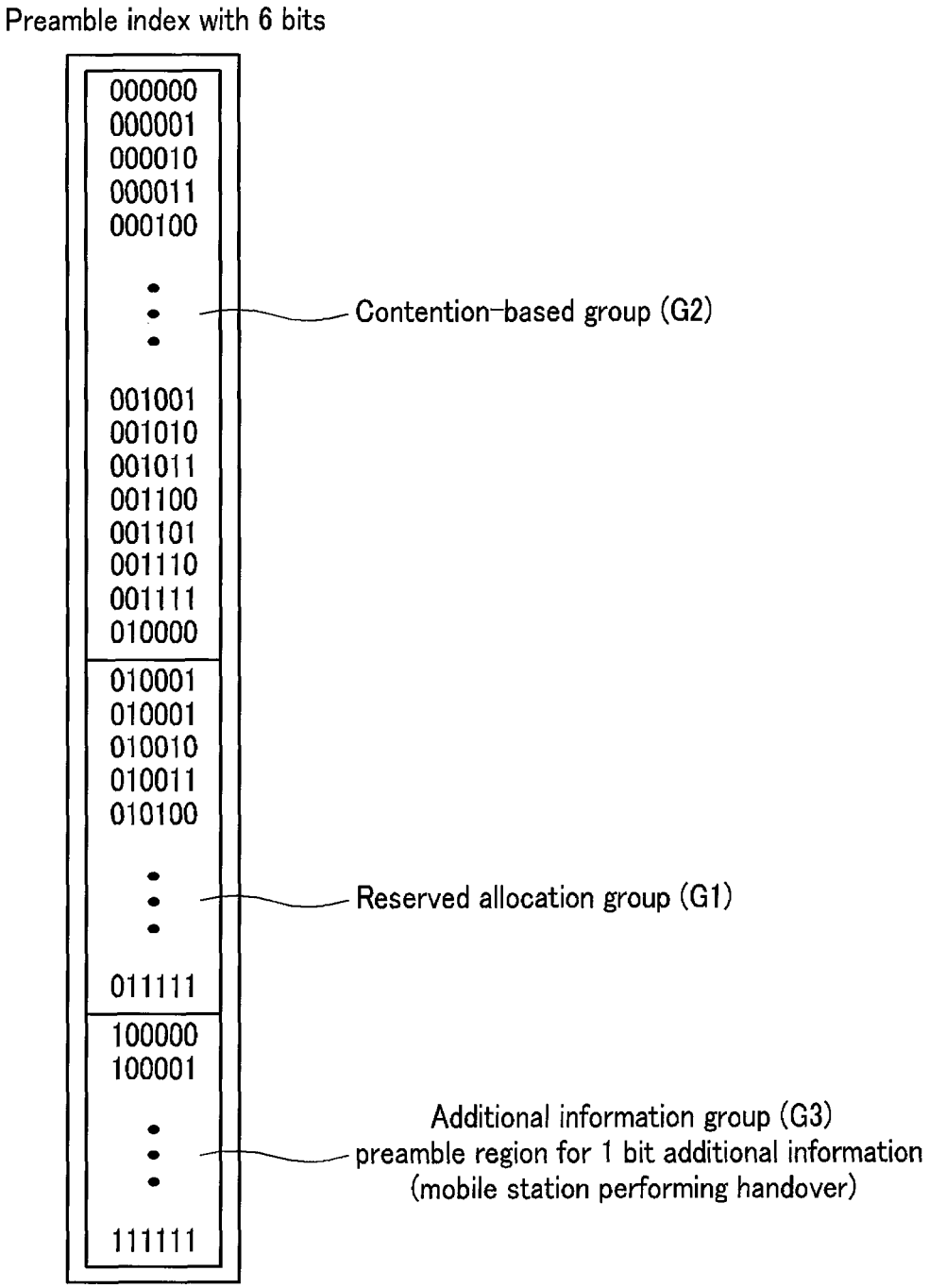
FIG. 7 shows an example of a preamble allocation method according to a third exemplary embodiment of the present invention.

FIG. 7 shows a preamble allocation method according to the third exemplary embodiment of the present invention corresponding to the first case.

It is assumed that there are preamble indexes of "000000"-"111111" as shown in FIG. 7.

Preamble indexes of "100000"-"111111" are set as an additional information group. Preamble indexes of an additional information group G3 are for mobile stations transmitting a preamble in which additional information of 1 bit represents handover indication information.

Other preamble indexes except for the additional information group G3 are divided into the reserved allocation group G1 and the contention-based group G2. In this instance, the preamble indexes of the reserved allocation group G1 are allocated to the remaining mobile stations that satisfy the predetermined condition from which mobile stations performing handover are excluded. That is, since preamble indexes for mobile stations performing handover are preset as the additional information group G3, the preamble index of the reserved allocation group G1 is allocated to mobile stations to which a base station transmits downlink data generating starting information.

More particularly, a base station 100 selects a preamble index from the additional information group G3, includes it in a handover response message, and transmits the same, as shown in the second example of the first exemplary embodiment, when receiving a handover request from a neighboring base station so that a corresponding mobile station transmits a preamble based on the preamble index.

However, even if the mobile station is performing handover, when the mobile station directly requests a handover without passing through the neighboring base station, that is, a source base station, the base station uses a preamble index of the contention-based group G2. The preamble indexes of the additional information group G3 may also be managed for mobile stations performing a handover based on contention. In this case, the preamble indexes of the reserved allocation group G1 may be only allocated to mobile stations satisfying the predetermined condition as in the first exemplary embodiment.

According to the management of the preamble indexes, when a preamble includes additional information representing that a corresponding mobile station is accessing through a handover process from a neighboring base station, a base station can easily determine whether or not the corresponding mobile station includes a preamble index that is preallocated to mobile stations that access through a handover process on the basis of the additional information and the index of the preamble.

A second case in which additional information represents a mobile station that does not perform initial access but rather maintains connection with a base station will now be described.

That is, the additional information represents that a corresponding mobile station receives allocation of its own identifier (or a scheduling identifier) from the base station.

Figure 8:
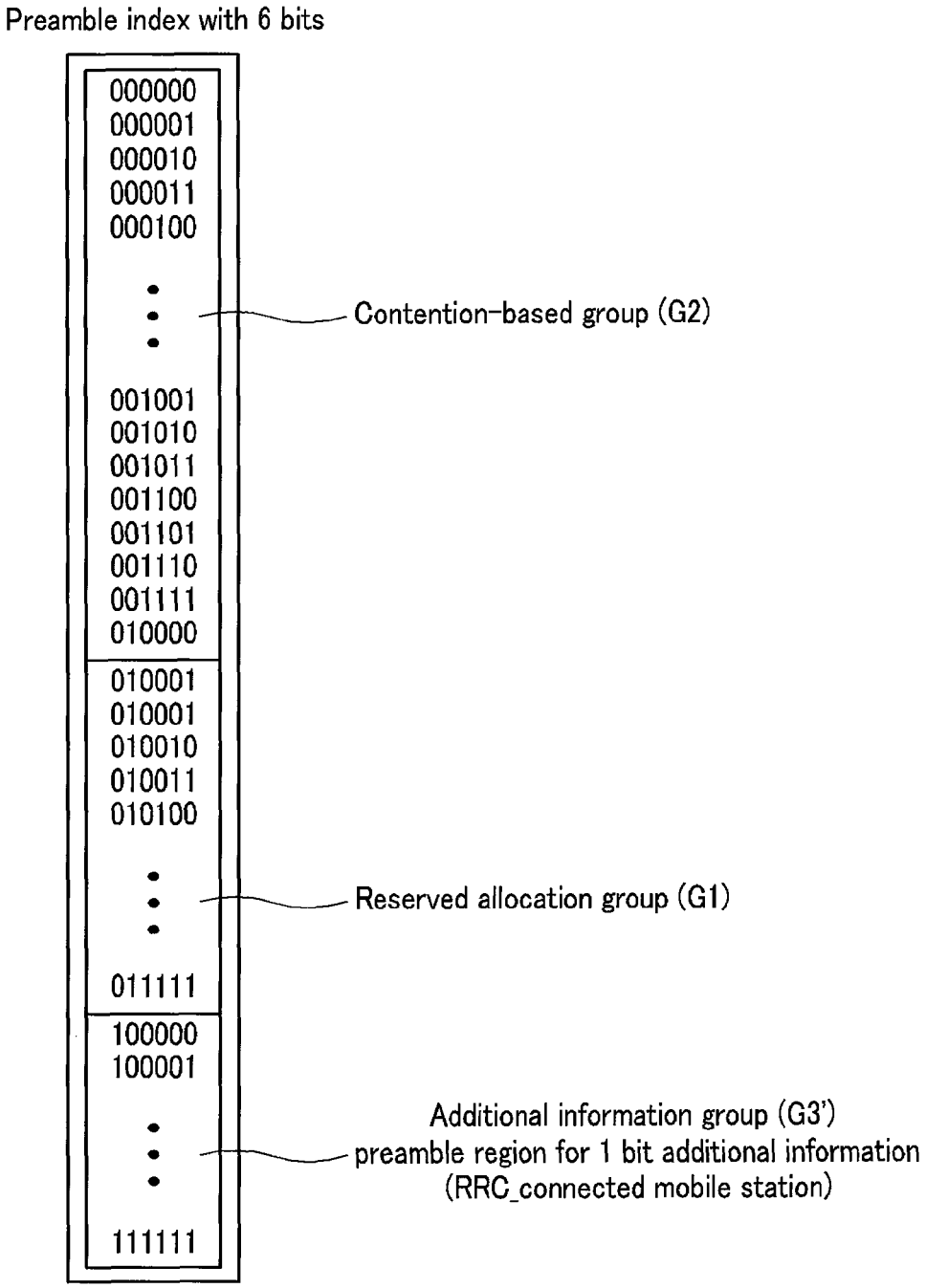
FIG. 8 shows another example of a preamble allocation method according to the third exemplary embodiment of the present invention.

FIG. 8 shows a preamble allocation method according to the third exemplary embodiment of the present invention corresponding to the second case.

It is assumed that there are preamble indexes of "000000"-"111111" as shown in FIG. 8.

Preamble indexes of "100000"-"111111" from the entire preamble indexes are set as an additional information group. Preamble indexes included in the additional information group (G3') are for mobile stations in which 1 bit of additional information of a preamble is active state indication information. That is, the preamble indexes are for RRC_connected mobile stations that maintain an RRC connection with a base station.

The remaining preamble indexes except for the additional information group G3' are divided into a reserved allocation group G1 and a contention-based group G2. In this instance, the preamble indexes of the reserved allocation group G1 are allocated to a mobile station performing a handover, a mobile station that maintains uplink physical layer synchronization and then receives notification of downlink service start, or a mobile station that receives allocation of an uplink radio resource for status reporting or measurement reporting from a base station.

Meanwhile, the preamble indexes of the additional information group G3' allocated to the RRC_connected mobile station can be managed based on contention. In this case, the mobile station randomly selects one from among the preamble indexes of the additional information group G3' and transmits it based on contention. The preamble indexes of the contention-based group G2 are used when mobile stations having no RRC connection with a corresponding base station, that is, mobile stations being in an RRC_idle state, perform initial access.

According to the management of the preamble indexes, the base station can easily determine whether or not the mobile station performs initial access when additional information of a preamble transmitted from the mobile station includes information indicating an idle state. Accordingly, a random access procedure performed after the mobile station transmits the preamble may be classified and managed distinctly.

In the third exemplary embodiment, preamble radio resources may be also divided into a contention-based region and a reserved allocation region according to an objective. In this case, if a mobile station generates a preamble based on a contention-based preamble index (e.g., contention-based groups G2 of FIG. 7 and FIG. 8 and an additional information group G3' of FIG. 8), the mobile station transmits the preamble through the contention-based region.

However, if a mobile station generates a preamble based on a reserved allocation based preamble index (e.g., reserved allocation groups G1 of FIG. 7 and FIG. 8 and an additional information group G3 of FIG. 7), the mobile station transmits the preamble through the reserved allocation region. It is possible for the preamble radio resources to not be divided into the contention based region and the reserved allocation region, as in the first exemplary embodiment. In this case, mobile stations transmit a preamble through the same preamble radio resource with no regard to receiving allocation of a preamble index in advance.

Since a person of ordinary skill in the art can realize the method of performing random access based on preamble indexes that are managed according to the third exemplary embodiment of the present invention on the basis of the first exemplary embodiment, a detailed description of the method of performing random access is omitted.

Mobile communication systems according to the exemplary embodiments of the present invention are based on OFDM(A), and radio resources are represented by two-dimensional coordinates with subcarrier indexes of a frequency axis and symbol indexes of a time axis. However, the present invention is not restricted to this, and can be applied to other radio resources of different types.

The above-described embodiments can be realized through a program for realizing functions corresponding to the configuration of the embodiments or a recording medium for recording the program in addition to through the above-described device and/or method, which is easily realized by a person skilled in the art.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A *communication* method [for a base station to allocate a preamble to a mobile station], comprising:

[classifying preamble resources into a contention-based group and a reserved allocation group to generate classification information for the preamble resources;

transmitting the classification information to the mobile station;]

selecting one preamble index belonging to [the] *a* reserved allocation group; [and]

sending, to [the] *a* mobile station, the selected preamble index belonging to the reserved allocation group;

*receiving, by a base station, a random access preamble from the mobile station, wherein the random access preamble is associated with an identifier, and the identifier is determined based on a frequency and a time through which the random access preamble is transmitted;*

*transmitting, by the base station, scheduling information to the mobile station through a control channel based on the identifier; and*

*transmitting, by the base station, a random access response to the mobile station through a shared channel for data transmission, wherein the scheduling information indicates at least a frequency and a time of the random access response at the shared channel for data transmission,*

[wherein the mobile station requests random access based on a corresponding preamble generated from the received selected preamble index] *wherein the random access preamble received from the mobile station corresponds to the selected preamble index.*

[2. The method of claim 1, wherein sending the one preamble index comprises:

sending, to the mobile station, the one preamble index via downlink data generating indication information.]

[3. The method of claim 1, wherein sending the one preamble index comprises:

sending, to the mobile station, the one preamble index via a handover-related message.]

[4. The method of claim 1, further comprising:

receiving a preamble corresponding to the one preamble index; and transmitting a random access response message to the mobile station.]

5. The method of claim [4] *1*, wherein the random access response [message] includes radio resource allocation information.

6. The method of claim 5, wherein the random access response [message] further includes information on the *random access* preamble transmitted by the mobile station.

[7. The method of claim 6, wherein the random access response message further includes at least one of downlink resource allocation information, scheduling identifier, and information on whether the base station successfully received the preamble based on the one preamble index informed by the base station.]

[8. The method of claim 1, wherein a preamble consists of a first part representing a random property and a second part representing additional information, wherein classifying the preamble resources comprises:

classifying the preamble resources into the contention-based group, the reserved allocation group, and an additional information group.]

[9. The method of claim 8, wherein the additional information is one of the following:

CQI (channel quality indicator) information representing whether a corresponding channel has greater quality than a predetermined value in a service area of the base station;

information representing that the mobile station accesses through a handover process from a neighboring base station; and information representing that the mobile station does not perform initial access but maintains a connection with the base station.]

[10. A method for a base station to perform a random access procedure with a mobile station, comprising:

classifying a plurality of random access preambles into a contention based random access preamble group and a non-contention based random access preamble group to generate system information including classification information which enables to classify the plurality of random access preambles;

broadcasting the system information;

selecting one random access preamble index corresponding to one random access preamble belonging to the non-contention based random access preamble group;

allocating, to the mobile station, the corresponding one random access preamble in association with the selected random access preamble index;

sending, to the mobile station the selected random access preamble index; and in response to receiving, from the mobile station, a random access request on the basis of the corresponding one random access preamble generated from the selected random access preamble index:

providing a random access response to the mobile station.]

[11. The method of claim 10, wherein allocating the one random access preamble comprises:

allocating, to the mobile station, the one random access preamble belonging to the non-contention based random access preamble group when downlink data is generated or the mobile station performs a handover.]

[12. The method of claim 10, further comprising:

receiving the allocated random access preamble; and transmitting a random access response to the mobile station.]

[13. The method of claim 12, wherein the random access response includes radio resource allocation information and information on the allocated random access preamble.]

[14. A method for a base station to perform a random access procedure with a mobile station, comprising:

classifying a plurality of random access preambles into a contention based random access preamble group and a non-contention based random access preamble group to generate system information including classification information which enables to classify the plurality of random access preambles;

broadcasting the system information;

selecting one random access preamble index corresponding to one random access preamble belonging to the non-contention based random access preamble group;

allocating, to the mobile station, the corresponding one random access preamble in association with the selected random access preamble index;

sending, to the mobile station the selected random access preamble index; and in response to receiving, from the mobile station, a random access request on the basis of the corresponding one random access preamble generated from the selected random access preamble index:

receiving the allocated random access preamble to provide a random access response to the mobile station.]

15. A [random access] *communication* method [of a mobile station], comprising:

[receiving, from a base station, system information including information which enables to classify a plurality of random access preambles into a contention based random access preamble group and a non-contention based random access preamble group;]

receiving, from [the] *a* base station, a [selected] random access preamble index [indicating allocation information for one] corresponding *to a* random *access* preamble belonging to [the] *a* non-contention based random access preamble group;

[when the mobile station receives] *in response to receiving*, from the base station, the [selected] random access preamble index, generating the corresponding random *access* preamble using the [selected] random access preamble index [and]*;* transmitting [a random access request including the corresponding]*, by a mobile station, the* random access preamble to the base station*, wherein the random access preamble is associated with an identifier, and the identifier is determined based on a frequency and a time through which the random access preamble is transmitted;*

*receiving, by the mobile station, scheduling information from the base station through a control channel based on the identifier*; and receiving*, by the mobile station,* a random access response from the base station *through a shared channel for data transmission, wherein the scheduling information indicates at least a frequency and a time of the random access response at the shared channel for data transmission.*

[16. A random access method of claim 15, when the mobile station does not receive allocation information for one random access preamble belonging to the non-contention based random access preamble group, transmitting one random access preamble belonging to the contention based random access preamble group to the base station.]

[17. The method of claim 15, wherein receiving the selected random access preamble index includes receiving the selected random access preamble index via downlink data generating indication information.]

[18. The method of claim 15, wherein receiving the selected random access preamble index includes receiving the selected random access preamble index via a handover-related message.]

[19. A random access method of a mobile station, comprising:

receiving, from a base station, system information including information which enables to classify a plurality of random access preambles into a contention based random access preamble group and a non-contention based random access preamble group;

receiving, from the base station, a selected random access preamble index indicating allocation information for one corresponding random preamble belonging to the non-contention based random access preamble group;

when the mobile station receives, from the base station, the selected random access preamble index, generating the corresponding random preamble using the selected random access preamble index and transmitting a random access request including the corresponding random access preamble to the base station;

when the mobile station does not receive random access preamble index indicating allocation information for random access preamble belonging to the non-contention based random access preamble group, transmitting a contention-based random access request including one random access preamble belonging to a contention based random access preamble group to the base station; and receiving a random access response from the base station.]

[20. The method of claim 19, wherein receiving the selected random access preamble index includes receiving the selected random access preamble index via downlink data generating indication information.]

[21. The method of claim 19, wherein receiving the selected random access preamble index includes receiving the selected random access preamble index via a handover related message.]

*22. The method of claim 15, wherein the random access response includes radio resource allocation information.*

*23. The method of claim 22, wherein the random access response further includes information on the random access preamble transmitted by the mobile station.*

*24. A communication device, comprising:*

*a circuitry configured to:*

*select one preamble index belonging to a reserved allocation group;*

*cause the communication device to send, to a mobile station, the selected preamble index belonging to the reserved allocation group;*

*cause the communication device to receive, from the mobile station, a random access preamble, wherein the random access preamble is associated with an identifier, and the identifier is determined based on a frequency and a time through which the random access preamble is transmitted;*

*cause the communication device to transmit scheduling information to the mobile station through a control channel based on the identifier; and*

*cause the communication device to transmit a random access response to the mobile station through a shared channel for data transmission, wherein the scheduling information indicates at least a frequency and a time of the random access response at the shared channel for data transmission,*

*wherein the random access preamble received from the mobile station corresponds to the selected preamble index.*

*25. The communication device of claim 24, wherein the random access response includes radio resource allocation information.*

*26. A terminal, comprising:*

*a circuitry configured to:*

*cause the terminal to receive, from a base station, a random access preamble index corresponding to a random access preamble belonging to a non-contention based random access preamble group;*

*cause the terminal to generate, in response to receiving from the base station the random access preamble*

*index, the corresponding random access preamble using the random access preamble index;*

*cause the terminal to transmit the random access preamble to the base station, wherein the random access preamble is associated with an identifier, and the identifier is determined based on a frequency and a time through which the random access preamble is transmitted;*

*cause the terminal to receive scheduling information from the base station through a control channel based on the identifier; and*

*cause the terminal to receive a random access response from the base station through a shared channel for data transmission, wherein the scheduling information indicates at least a frequency and a time of the random access response at the shared channel for data transmission.*

*27. The terminal of claim 26, wherein the random access response includes radio resource allocation information.*

*28. The terminal of claim 27, wherein the random access response further includes information on the random access preamble transmitted by the terminal.*

*29. A communication device for a terminal, the communication device comprising:*

*a memory, and*

*a processor operably coupled to the memory, wherein the processor, when executing program instructions stored in the memory, is configured to:*

*cause the terminal to receive, from a base station, a random access preamble index corresponding to a random access preamble belonging to a non-contention based random access preamble group;*

*cause the terminal to generate, in response to receiving from the base station the random access preamble index, the corresponding random access preamble using the random access preamble index;*

*cause the terminal to transmit the random access preamble to a base station, wherein the random access preamble is associated with an identifier, and the identifier is determined based on a frequency and a time through which the random access preamble is transmitted;*

*cause the terminal to receive scheduling information from the base station through a control channel based on the identifier; and*

*cause the terminal to receive a random access response from the base station through a shared channel for data transmission, wherein the scheduling information indicates at least a frequency and a time of the random access response at the shared channel for data transmission.*

*30. The communication device of claim 29, wherein the random access response includes radio resource allocation information.*

*31. The communication device of claim 30, wherein the random access response further includes information on the random access preamble transmitted by the terminal.*

*32. The communication device of claim 25, wherein the random access response further includes information on the random access preamble transmitted by the mobile station.*

* * * * *